Patented June 10, 1930

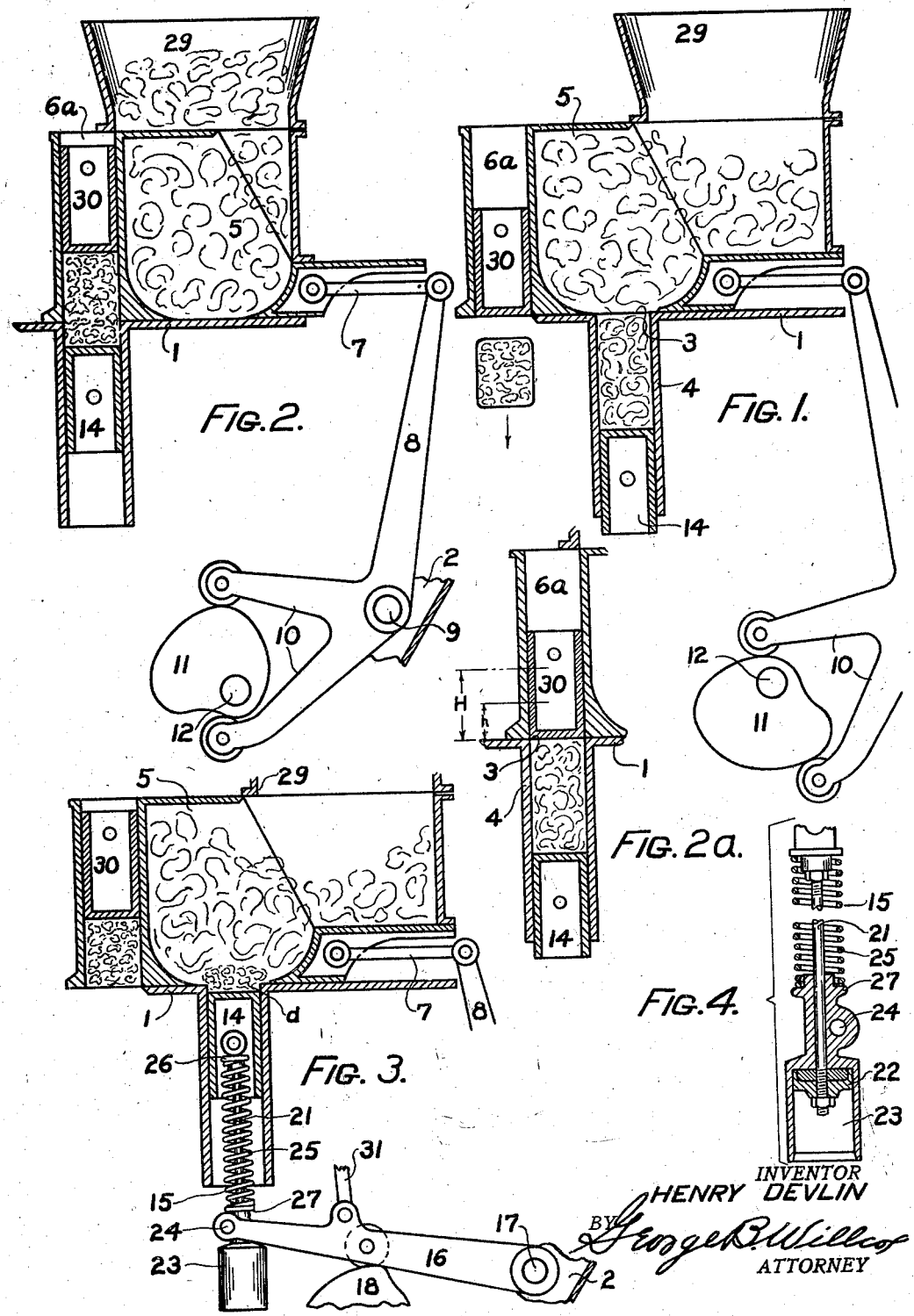

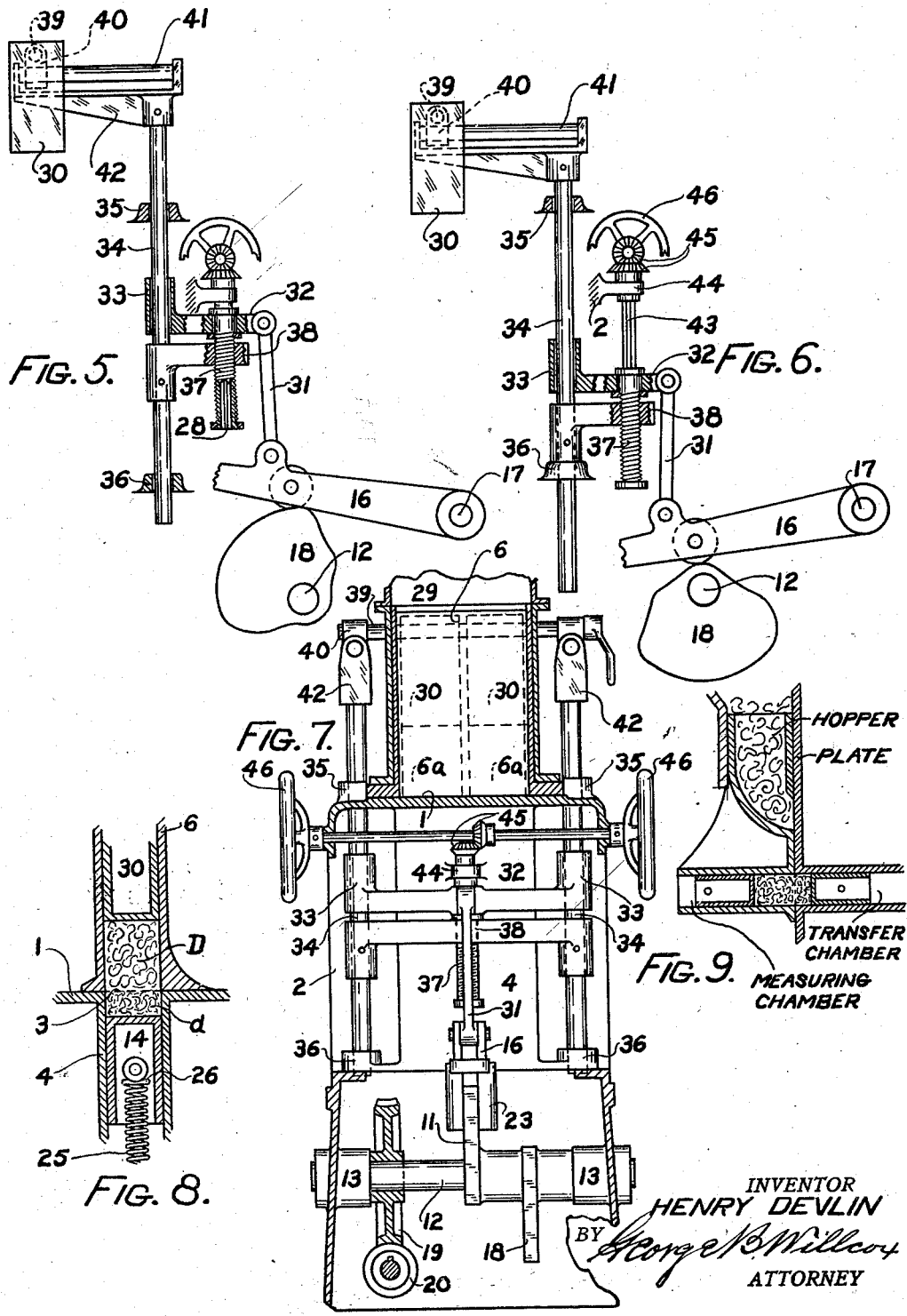

1,763,345

UNITED STATES PATENT OFFICE

HENRY DEVLIN, OF SAGINAW, MICHIGAN, ASSIGNOR TO BAKER PERKINS COMPANY, INC., OF SAGINAW, MICHIGAN, A CORPORATION OF NEW YORK

DOUGH DIVIDER

Application filed February 25, 1928. Serial No. 256,967.

This invention relates to a dough divider that converts a dough supply received from a mixer into a number of individual dough pieces and delivers them to the next step of the bread-making process, namely, the loaf forming or rounding operation.

As will be disclosed in the specification, the features by which this invention is essentially characterized and differentiated from the dough dividing machines of the prior art are its ability to receive in its hopper a mass of dough that contains random gas-filled voids caused by fermentation and to convert it rapidly into loaf pieces of uniform density and accurate weight although they are measured by volume; to maintain the desirable elastic qualities of the gluten in the dough by avoiding wire-drawing, hammering and excessive pressure conditions that have heretofore obtained in dough dividers; to transfer the dough pieces through the successive steps of the machine's operation by moving the dough masses in straight lines and by the shortest possible routes; to avoid compressing the dough pieces until just before the final severing and to immediately return the remainder piece of dough to the hopper, reincorporating it with the dough mass instead of leaving it in the intermediate or pressure chamber, as heretofore and spoiling its elasticity by reworking.

The present invention is adapted either to single loaf or multiple loaf dividers and consists primarily as above indicated, in a novel arrangement of the supply hopper and measuring chamber with relation to each other, and of both in relation to the transfer chamber.

In addition to the above primary objects of the invention certain other important objects more or less dependent upon them are attained, such as ability to quickly and easily change the setting of the machine from small loaves to the production of large loaves, or vice versa. This adjustment is more than a mere mechanical expedient, for it has to do with the prime functions of the machine in that it also brings about a proportionate change in the amount of pressure applied to the ends of large or small dough pieces, reducing them to substantially the same degree of density before being severed. Accurate weight from volumetric measurement is thus assured regardless of loaf size. Means is also provided for preventing too great pressure on the dough pieces.

A still further object is to make the machine safer for the operator by avoiding the use of heavy weighted levers and like pressure devices heretofore commonly employed and frequently responsible for personal injuries caused by the sudden operation of the mechanism if the weight dropped accidentally.

The present invention insures smoothness of operation, because it gives steady reliable pressure on the dough at all rates of production, whereas high speed operation in a weight-actuated machine does not give steady dependable pressure, but a series of repercussions or hammering stresses that jar the entire machine and cause chattering, besides injuring the dough.

With the foregoing and certain other objects in view, which will appear later in the specification, my invention comprises the devices described and claimed and the equivalents thereof.

In the drawings Fig. 1 is a part vertical section through the dividing head and transfer chamber, showing the hopper in register with the transfer chamber.

Fig. 2 is a view similar to Fig. 1, showing the measuring chamber in register with the transfer chamber.

Fig. 2ª is a diagrammatic sectional detail, showing the relative locations of the ram of the transfer chamber and the measuring plunger just previous to pushing the dough into the measuring chamber.

Fig. 3 is a view similar to Fig. 1, showing the remnant dough piece being returned to the hopper; also showing the actuating mechanism for the ram.

Fig. 4 is a longitudinal sectional detail of the link element that operates the ram.

Fig. 5 is a part sectional side view of the mechanism that actuates the measuring plunger, the latter shown in its raised position.

Fig. 6 is a similar view, with the measuring plunger at its lower limit of travel.

Fig. 7 is a part sectional rear view of the machine, showing the vertically movable framework that carries the measuring plungers and the screw-adjusting means for setting the machine to produce larger or smaller loaves.

Fig. 8 is a view similar to 2, showing the relation of the measured dough piece to the surplus remnant.

Fig. 9 is a part sectional diagrammatic view of a modified arrangement in which the plate is in a vertical plane.

In the embodiment of the invention shown in the accompanying drawings, which illustrate a preferred arrangement, the primary elements are a flat plate 1, on a supporting frame 2, the plate formed with a hole 3 that communicates with the transfer chamber 4. On the opposite side of the plate is a supply hopper 5 and also the measuring chamber 6, which together constitute a unitary dividing head capable of relative back-and-forth movement with respect to the plate 1.

In practice the plate 1 and the transfer chamber 4 are preferably stationary, the dividing head sliding over the face of the plate, but conceivably the dividing head may be stationary and the plate and the transfer chamber may slide; or the plate may be otherwise than horizontal, as in Fig. 9 without departing from the claimed invention. Likewise the plate need not be flat as shown herein, but conceivably may be somewhat curved or part-cylindrical in shape.

Mechanism is provided for moving the supply hopper 5 and the measuring chamber 6 alternately and in predetermined sequence into register with the hole 3 in the plate. This mechanism consists of a link 7 pivotally attached to the hopper and to the upright arm 8 of an L-shaped lever, which is pivoted to a fixed support 9 on the frame. The other arm 10 of the L-lever is bifurcated and provided with bearing rollers that ride on a cam 11 fixed to a rotatable drive shaft 12 supported in bearings 13 on the frame. A ram 14, slidable lengthwise in the transfer chamber 4, derives its movement from a link 15 (Fig. 3) which is pivoted at its upper end to the ram 14 and at its lower end to an arm 16 which is pivoted at one end to a fixed support 17 on the frame 2. The arm can oscillate up and down in a vertical plane, being operated by a rotatable cam 18. This cam, as also the cam 11 that actuates the dividing head is fixed to the drive shaft 12. Any suitable means, as the worm wheel 19 and the power-driven worm 20 shown in Fig. 7 is used to turn the drive shaft 12.

When the cam 18 is at top position, shown in Fig. 3, the ram 14 is also at its top position, that is, at or close to the level of the top face of the plate 1.

The downward stroke of the ram 14 is capable of adjustment for making different sized loaves, and for that purpose suitable limit stops are arranged to halt the downward travel of the oscillating arm at whatever point desired. A preferred structure embodying means for effecting this stroke adjustment of the ram 14 will be described in detail later.

The ram during its upward travel is adapted to exert yielding pressure against and thereby compress a dough piece while pressing it into the pockets 6ª of measuring chamber 6. To produce such action the link element 15 is made up of a rod 21 pivoted at its upper end to the ram 14, its lower end provided with a piston 22 and slidable in an axially bored dash pot 23 which is journaled to the end of oscillating arm 16 by means of a pivot pin 24.

A helical spring 25 is seated between two collars, one, 26, on the rod 21 and the other, 27, on the dash pot, Fig. 4. The spring is set to exert pressure up to any desired amount, say, one hundred twenty five pounds, before it will compress any farther. Its ultimate maximum pushing force depends upon and is directly proportional to the size of the loaf, which is an essential condition for producing small or large dough pieces of the same degree of density.

The dash pot piston 22 is employed to prevent too sudden movement of the spring when the pressure against the ram 14 is released.

Hopper 5 may be made in one piece to serve merely as an ordinary dough container, but preferably there is provided in conjunction with it another stationary dough reservoir 29, which is mounted in fixed position on the frame 2 and arranged in telescopic relation with the supply hopper 5, so that at each reciprocation of the dividing head the dough mass in the hopper 5 and in the communicating reservoir 29 is subjected to gentle but effective squeezing, pressing and kneading action alternating with a subsiding and plastic flowing movement, the effect being to gently work out or disperse the larger gas pockets in the mass without harmfully agitating the dough or depreciating the elasticity of the gluten. In this structure the hopper 5 consists only of mouth, end and side pieces, and reservoir 29 has part of one side removed to receive hopper 5.

Measuring chamber 6 has slidable plungers 30 which are mechanically actuated and timed with the movements of the ram in the transfer chamber 4. On its downward stroke the measuring plunger 30 always goes down to the level of the face of plate 1. Its return or up stroke is capable of limited adjustment, higher for large loaves and lower for small loaves, as shown respectively at H and H in Fig. 2ª.

The function of the measuring plunger 30 is to assume a temporarily fixed position at such height in the measuring pocket 6ª as corresponds to the size of the desired dough piece and to remain there until the measuring pocket has been filled with dough driven in by the ram 14, then to move down and expel the dough piece after the latter has been sheared off as a result of the sliding movement of the dividing head, 5, 6.

The above described operations of the measuring plunger 30 are derived from the same cam 18 and pivoted arm 16 that operate the ram 14. Suitable operating elements connecting the oscillating arm 16 and the measuring plunger 30 are shown in Figs. 5 and 6, where a connecting rod or link 31 is pivoted at its lower end to the oscillating arm intermediate its ends. The upper end of this link is pivoted to a cross-head 32, so that the link moves the cross-head up and down. The cross-head is guided by a pair of arms with bearings 33 at their ends. The bearings are slidable up and down on upright guide bars 34 which are located at the sides of the machine and are themselves slidably mounted in bearings 35, 36 on the frame 2. A depending screw 37 is swiveled in the cross-head 32 so as to turn freely and upon this screw is threaded a boss 38 which is integral with a vertically movable framework that extends to the top of the machine where the measuring plungers 30 are attached to it. The upright guide bars 34 constitute part of this vertically movable framework, the structural details of which will be described later.

During the operation of the machine the swiveled screw 37 does not rotate, being used only as a connecting element through which the link 31 and cross-head 32 are enabled to move the frame up and down for actuating the measuring plungers 30. Turning the screw adjusts the distance between the threaded boss 38 and the cross-head 32 whenever it is desired to vary the vertical lift of the measuring plungers in order to bring about different dough measurements and produce larger loaves or smaller loaves.

The details of the framework that carries the measuring plungers is shown in Figs. 5, 6, 7, where a horizontal bar 39 extending through the plungers 30 from side to side has its ends projecting outwardly at the sides of the machine and supported in two bearing members 40 which are slidable along parallel horizontal ways 41. The ways are supported at their back and front ends on brackets 42 fixed to the upper ends of the vertically slidable guide bars 34 previously mentioned. The function of the ways 41 is to permit the measuring chamber 6 to slide freely back and forth with the dough hopper 5 without affecting its up-and-down movement.

Referring now to the functions of the vertically movable frame, still noting Figs. 5, 6, 7, it is seen that the two guide bars 34 travel together, being rigidly connected to threaded boss 38, and that whatever up-and-down movement is given to the cross-head 32 by the link 31 is transmitted through the screw 37 to the boss 38, thence to the upright guide bars 34 and to the measuring plungers 30.

When the screw is revolved for adjusting loaf sizes it acts to raise or lower the reciprocating frame and the measuring plungers 30 with relation to the cross-head 32.

It is to be observed that the cross-head always stops its upward travel in the same place corresponding to the peak lift of the cam 18 that actuates it. The top limit of lift of the measuring plungers 30 depends, however, upon the adjusted position of the threaded boss 38 on the screw 37. Adjusting the boss upward by rotating the screw will cause the measuring pockets to produce larger loaves, or vice versa.

The screw is bored axially as shown in Fig. 5 and is formed with an internal longitudinal keyway 28. In the channel thus made a spline shaft 43 is slidably received. The spline shaft is suspended from a swivel bearing 44 in a bracket that is fixed to the frame 2 of the machine and can be rotated by means of bevel gears 45 and either of two hand wheels 46. Turning either of these hand wheels automatically sets the measuring plunger to produce larger or smaller loaves in the way above described.

The amount of dough that is taken into the transfer chamber 4 at each operation is always kept automatically proportioned to the size of the dough piece that is to be delivered from measuring pockets 6ª, since the effective travel of their respective plungers 14 and 30 is derived from the same oscillating arm 16, Fig. 3, but at different radial distances from its pivoted end 17. This ratio is maintained regardless of changes in the actual size of the dough pieces to be measured.

The operating mode of the machine will now be described considering the cycle of operation as divided into six principal steps.

A—With the dividing head positioned as in Fig. 1 transfer chamber 4 fills with dough from supply hopper 5 with the downward movement of ram 14.

B—The dividing head which includes both the hopper and the measuring chamber slides to the right on plate 1 to the position shown in Fig. 2, cutting off the supply from the hopper to the filled transfer chamber and bringing the measuring pockets 6ª into register with the opening of the plate 1 and transfer chamber 4 as shown in Fig. 2ª.

C—The ram 14 and measuring plungers 30 move upward at the same time under the action of oscillating arm 16, but the ram 14, being attached to the end of the arm, moves both faster and farther than the measuring plunger 30 which is actuated from a point nearer the middle of the arm. Such upward and approaching movement of both plungers continues until the predetermined amount of dough has entered the measuring pockets 6ª. During the transfer, since the ram 14 and plungers 30 are gradually drawing closer together while both are moving upward, the dough is being compressed. At some stage of this upward movement the push of the ram 14 against the dough becomes equal to the amount for which the spring 25 was set. Consequently from then on the continued rise of arm 16 compresses the spring which puts a limit to the amount of final pressure that can be exerted by ram 14 against the dough piece. The compression of the spring is later utilized to expel the surplus dough piece left in the transfer chamber after the measured loaves have been severed.

At this stage of operation the condition is as shown in Fig. 8, where D is the compressed measured dough piece and $d$ is the remnant of compressed dough in the transfer chamber 4.

D—The dough piece remnant $d$ is sheared off at the next sliding movement of the dividing head to the left, where it takes the position shown in Fig. 3, bringing the mouth of hopper 5 into register with the pressure chamber 4.

E—The compressed remnant $d$, impelled by ram 14 and the free expansion of the compressed spring 25 is pushed up through hole 3 into supply hopper 5, where it is incorporated with the main dough mass. Here the rod 21 and dash pot piston 22 come into play to limit the upward speed of spring pressed ram 14 and to prevent jar.

F—The ram 14 descends and transfer chamber 4 again fills with dough from hopper 5 under atmospheric pressure while the loaves that have just been measured are ejected from the measuring pockets 6ª as shown in Fig. 1.

I have shown and described transfer of the dough and its initial compacting as caused by the joint movements of the ram 14 and measuring plungers 30, resulting from their attachment to two points spaced radially apart or a single oscillating arm 16 actuated by a cam 18. It will be understood, however, that the inventive factors involved in this conception can be embodied in different mechanical arrangements employing the same mode of operation, as for example, two oscillating arms of different lengths, each actuated by its own cam.

Having thus described my invention what I claim and desire to secure by Letters Patent is:

1. In a dough dividing machine including an apertured plate and a movable dividing head comprising a supply hopper and a measuring chamber integral therewith, a transfer chamber communicating with said aperture, a ram in the transfer chamber, plungers in the measuring chamber, an actuating linkage connecting the ram and plungers said linkage arranged to impart to said ram and plunger differential movement while making their transfer stroke whereby a dough piece between them is subjected to gradually increasing pressure while being transported from the transfer chamber to the measuring chamber.

2. A dough dividing machine constructed and operating as set forth in claim 1 wherein the transfer ram is cushioned by a yieldable backing means that limits to a predetermined amount the pushing force which the ram is permitted to exert against said dough piece, and adjusting means adapted to proportionately alter at one operation the length of stroke of the ram, the length of stroke of the plunger, and the said maximum allowable pressure.

3. In a dough dividing machine of the class described the combination of a plate with a hole therein, a main supply hopper on one side of the plate comprising a stationary main chamber and a movable auxiliary chamber telescoping therewith to produce a gentle kneading action on the dough in the supply hopper, the mouth of the auxiliary chamber capable of moving into and out of register with the hole in the plate in shearing cooperation therewith.

4. In a dough dividing machine of the class described, the combination of a plate formed with a hole, a supply hopper on one side of the plate having its mouth capable of moving into and out of register with said hole in shearing relation with the plate, a measuring chamber on the same side of the plate as the hopper and capable of moving alternately therewith into and out of register with said hole and also in shearing relation with the plate, a transfer chamber communicating with the hole at the side of the plate opposite the hopper and measuring chamber, means for producing said relative movements of the measuring chamber, hopper and plate, transfer means for moving material from the hopper to the transfer chamber and from the transfer chamber into the measuring chamber and simultaneously compacting it, comprising a ram in the transfer chamber, a plunger in the measuring chamber and means for simultaneously actuating them in co-operative relation with the movements of the measuring chamber and hopper whereby material from the supply hopper is caused to undergo handling in the successive operating steps of the machine in the form of dough charges which are constrained to maintain substantially their original shape, their internal structure and their elastic properties during such handling.

5. A dough dividing mechanism comprising a dividing head including a supply hopper and a measuring chamber having pockets with plungers slidable therein, a plate having an opening and a transfer chamber with a ram slidable therein in communication with said opening, actuating means for producing relative sliding movement of the dividing head and the plate to bring the mouth of the supply hopper and the mouth of the measuring hopper alternately into register with the mouth of the transfer chamber, actuating devices for simultaneously moving the said measuring plungers and transfer ram in the same direction but at relatively different rates of travel to cause them to approach each other during their transfer stroke for compacting a piece of dough between them and to move apart during their return stroke, a compressible spring element, operatively interposed between said ram and its actuating means, serving to limit to a predetermined amount the pushing force of the ram against the dough piece and also to return to the hopper a surplus dough remnant from the transfer chamber, said actuating devices provided with adjusting means for altering the length of travel of said measuring plungers and said transfer ram so that the amount of maximum pressure is also altered proportionately thereto.

6. In a dough dividing mechanism having a transfer ram and a measuring plunger, actuating means adapted to impart to said ram and plunger, differential movements whereby a dough piece received between them is progressively compacted during its passage from a transfer chamber to a measuring chamber, a spring element constituting a yieldable cushion-like backing for said ram to limit the amount of pushing force that can be exerted by the ram against the dough piece, and furthermore adapted when freed to expand and thereby cause the ram to expel from the transfer chamber a dough remnant.

7. In a dough dividing mechanism including a supply hopper and having a transfer ram and a measuring plunger mechanically connected together so as to be differentially movable and adapted to compact a dough piece between them during its passage from a transfer chamber to a measuring chamber, a yieldable backing for said ram to limit the amount of pushing force that can be exerted by the ram against the dough piece, and furthermore adapted to expand when freed and to thereby cause the ram to expel a dough remnant from the transfer chamber into the hopper.

8. In a dough dividing machine of the class described, an apertured plate, a dividing head comprising a stationary dough reservoir, a hopper movable to-and-fro along said plate relatively to said reservoir, a measuring chamber integral with said hopper, and a transfer chamber communicating with the aperture of said plate, for the purposes set forth.

In testimony whereof, I affix my signature.
HENRY DEVLIN.